Jan. 8, 1929.
T. ANTHONY
1,698,465
RESTAURANT CHECK PROTECTING DEVICE
Filed Jan. 16, 1928
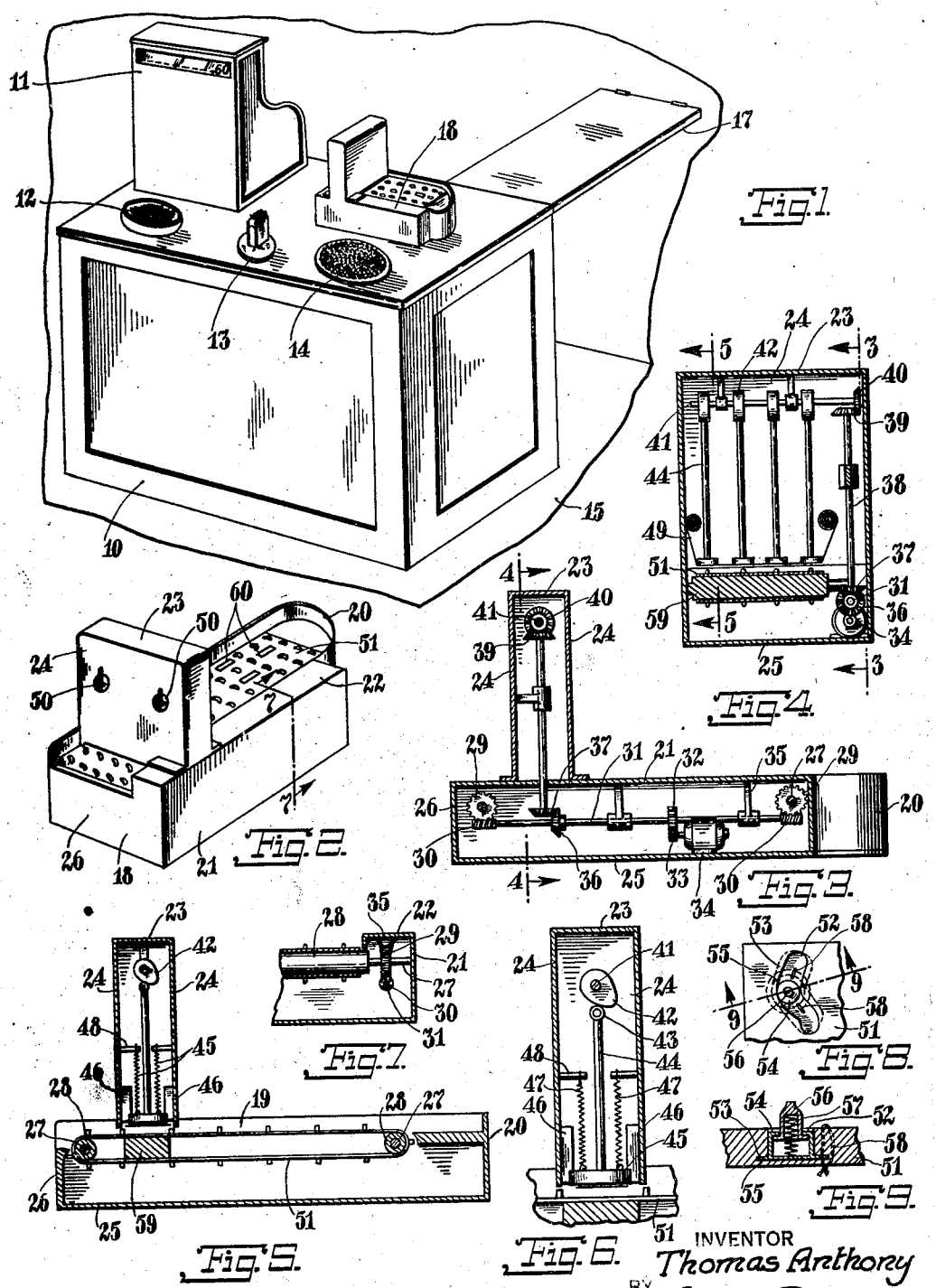
INVENTOR
Thomas Anthony
BY
Zoltan Holachek
ATTORNEY Patented Jan. 8, 1929.

1,698,465

UNITED STATES PATENT OFFICE.

THOMAS ANTHONY, OF NEW YORK, N. Y.

RESTAURANT-CHECK-PROTECTING DEVICE.

Application filed January 16, 1928. Serial No. 246,974.

This invention relates generally to protectors, and has more particular reference to a lunch room check protector.

The invention has for an object the provision of a device of the class mentioned which is of simple construction, efficient in action, and which can be manufactured and sold at a reasonable cost.

In lunch rooms, and places where records of purchases are kept by punching checks given to the buyers upon entrance to the establishment, many channels are left open for fraudulent persons to cheat the establishment. One of the methods often used is to obtain checks with small amounts punched thereon from crooked insiders who steal from the cashier. The fraudulent person then enters the establishment and receives a check in the usual manner. Purchases for a large amount are then made and the genuine check given to the sales person for punching. Upon leaving the establishment the fraudulent check bearing a small charge thereon is given to the cashier and this amount paid. Another method used by insiders is that the cashier returns the paid checks to the waiter who gives it to a new customer who spends more than the amount shown on the original check and adds the difference on the check. The cashier collects the new sum and usually keeps the first amount for himself.

The check protector, hereinafter fully disclosed, is adapted to be placed on the counter supporting the cash register. As the customers leave the establishment and pay their checks, the customer places the checks into the protector which cancels them by printing some notation thereon, such as "paid" or "void" and numbered. It is readily seen that should these checks be stolen from the cash desk, they cannot be used because of the cancellation which would be seen by the customer.

The device consists of an endless belt capable of carrying checks placed thereon, beneath cancelling dies. These dies are mechanically operated in unison with the belt, means for applying the cancellation to different parts of the checks are provided so that if a check is passed thru the machine twice, the manager of the establishment can question the cashier to find out whether some fraudulent person used a check previously cancelled.

For further comprehension of the invention, and of the objects and advantages thereof, reference will be had to the following description and accompanying drawing, and to the appended claims in which the various novel features of the invention are more particularly set forth.

Referring to the accompanying drawing, forming a material part of this disclosure:—

Fig. 1 is a perspective view of a cashier's counter, and the check protector device thereon.

Fig. 2 is a perspective view of the check protector device.

Fig. 3 is a vertical sectional view, taken directly behind the near side wall as seen in Fig. 2, equivalent to line 3—3 of Fig. 4.

Fig. 4 is a transverse vertical sectional view taken on the line 4—4 of Fig. 3.

Fig. 5 is a longitudinal vertical sectional view, taken on the line 5—5 of Fig. 4.

Fig. 6 is an enlarged fragmentary view of Fig. 5.

Fig. 7 is a fragmentary transverse vertical sectional view, taken on the line 7—7 of Fig. 2.

Fig. 8 is an enlarged detail plan view of a portion of the belt used in the device.

Fig. 9 is a fragmentary vertical sectional view taken on the line 9—9 of Fig. 8.

The reference numeral 10 indicates generally an ordinary cashier's counter provided with cash register 11, a bowl of toothpicks 12, some matches 13, and a change mat 14. The counter is illustrated as standing on floor 15, near the wall 16, and a common hinged shelf 17 extends from the wall to the counter. The lunch check protector 18 rests on the counter near the register 11.

The protector 18 has a frame of substantially U-shape, consisting of an arm 19, a bend 20, and a second arm 21 having a horizontal top portion 22. A vertically disposed U-shaped strip 23 has its arms integral with the arms 19 and 21. Cover plates 24 are attached to the front and rear ends of the U-strip 23. A base plate 25 is attached to the bottom of the frame and a front plate 26 is attached to the open front end of the frame.

Transverse shafts 27 have their ends mounted in the arms 19 and 21, and pulleys 28 are fixed on the shafts. Each of the shafts are provided with a worm wheel 27 meshing with worm pinions 30 on a shaft 31 longitudinally mounted. A gear 32 is fixed on the shaft 31 and meshes with a pinion 33 connected with the electric motor 34. The shaft 31 is supported by standards 35 depending from the arm portion 22.

Bevel gear 36 is fixed on shaft 31, and meshes a bevel gear 37 on a vertically supported shaft 38 extending upwards along one side of the U-member 23. A bevel gear 39 is attached to shaft 38, and meshes with gear 40 on a horizontal shaft 41 supported from the top of the member 23.

A plurality of cams 42 are attached on the shaft 41. Each cam is abutted by runners 43 on the top ends of rods 44 provided with printing dies 45 at their lower ends.

The printing dies 45 are vertically slidably mounted by engaging guides 46 projecting from the plates 24. Tension springs 47 are attached to the tops of the dies and to pegs 48 projecting from the plates 24. An inking tape 49 is mounted between the covers 24 and guided beneath the disc 45. The plates 24 are provided with small cover discs 50 which may be removed so that the tape 49 may be manually advanced.

An endless belt 51 is mounted on the rollers 28 and is formed with a plurality of rows of bent slots 52 formed with lower enlarged recesses 53, there being as many rows as there are dies 45. Each of the bent slots 52 has a button member 54 with an enlarged bottom flange 55 slidably arranged therein. A pointed member 56 is vertically slidably arranged in the button member and urged into extended position by expansion spring 57. Stitches 58 serve to secure the button members in any parts of the slots.

In operation, the cashier closes a switch to operate motor 34. The motion of the motor is transmitted to rotate rollers 28 and move the belt 51, and also to operate shaft 41 so that the dies 45 are periodically depressed against the belt 51, a co-acting stationary block 59 projects from the arm 19 beneath the belt, directly below the dies. As the cashier receives the checks from customers, he places them on any of the pointed members 56, the checks preferably are provided with apertures for this purpose. The belt 51 moves the checks beneath the ribbon 49 and the dies 45 cancel the checks. The gearing which drives the belt and the cams is so designed that each check receives only one cancellation, on any part thereof, as determined by the particular pointed member upon which the check is placed. When the dies 45 descend, the pointed members 56 are depressed so as not to interfere with the cancellation operation. It is not very important after the checks have been cancelled whether their apertures engaged on the pointed members, since they will move along with the belt by reason of being pushed along by the pointed members. The threads 58 may be cut and the positions of the pointed members readjusted, and then the flanges 55 may again be sewn in place. Checks indicated by numeral 60 are placed on the belt on the right hand side of the cancellation means, and these checks drop off the belt upon the counter 10 on the left-hand end of the belt.

While I have shown and described a preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. A lunch room check protector, comprising a frame, stamping means mounted therein, an endless belt mounted in the frame, means for driving the belt, connections from said driving means for operating the stamping means, and laterally adjustable pins on the belt for carrying checks past the stamping means in different relative positions to the stamping means, consisting of curved slots formed in the belt, and depressible pins mounted in different parts of the slots.

2. A lunch room check protector, comprising a frame, stamping means mounted therein, an endless belt mounted in the frame, means for driving the belt, connections from said driving means for operating the stamping means, and laterally adjustable pins on the belt for carrying checks past the stamping means in different relative positions to the stamping means, consisting of curved slots formed in the belt, and depressible pins mounted in different parts of the slots, the depressible pins being normally urged to extended positions by expansion springs.

3. A lunch room check protector, comprising a frame, stamping means mounted therein, an endless belt mounted in the frame, means for driving the belt, connections from said driving means for operating the stamping means, and laterally adjustable pins on the belt for carrying checks past the stamping means in different relative positions to the stamping means, consisting of curved slots formed in the belt, and depressible pins mounted in different parts of the slots, the depressible pins being normally urged to extended positions by expansion springs, and the stamping means being capable of depressing these pins so as to perform its functioning unhindered.

In testimony whereof I have affixed my signature.

THOMAS ANTHONY.